Jan. 6, 1959 C. PEARSON, JR 2,867,694

DISC RECORD CUTTING MEANS

Filed Dec. 7, 1956 2 Sheets-Sheet 1

INVENTOR.
CHARLES PEARSON, JR.
BY Max R. Kraus
Att'ys.

DISC RECORD CUTTING MEANS

Filed Dec. 7, 1956 2 Sheets-Sheet 2

INVENTOR.
CHARLES PEARSON, JR.
BY Max R. Kraus
Att'ys.

United States Patent Office 2,867,694

Patented Jan. 6, 1959

2,867,694

DISC RECORD CUTTING MEANS

Charles Pearson, Jr., Elmhurst, Ill.

Application December 7, 1956, Serial No. 626,937

7 Claims. (Cl. 179—100.4)

This invention relates to a disc record cutting means and particularly to a novel and simple means for cutting recording grooves in a flat disc record.

Disc records for home recording are well known and generally comprise a disc having a soft surface which may be readily cut by a stylus. The surface of the disc may be of relatively soft metal such as aluminum or may be of plastic such as cellulose acetate or the like. To operate on such records, a transducer having a cutting stylus is necessary. In addition thereto, it is essential that the cutting stylus be adapted to create a record track during the process of recording.

While many devices are available for cutting record discs, such devices are generally complicated, expensive and not adapted for use by an unskilled person. This invention provides a recording head for disc records which is characterized by simplicity of design and manufacture as well as simplicity of use. While the construction embodying the present invention may assume a wide variety of forms, a simple embodiment of the same will be disclosed in connection with the drawings. It is understood however that variations may be made without departing from the scope of the invention as defined by the appended claims.

Referring to the drawings, Figure 1 is a top plan view of a turntable supporting a blank record and record track guide discs having a tone arm containing the new recording head.

Figure 1:
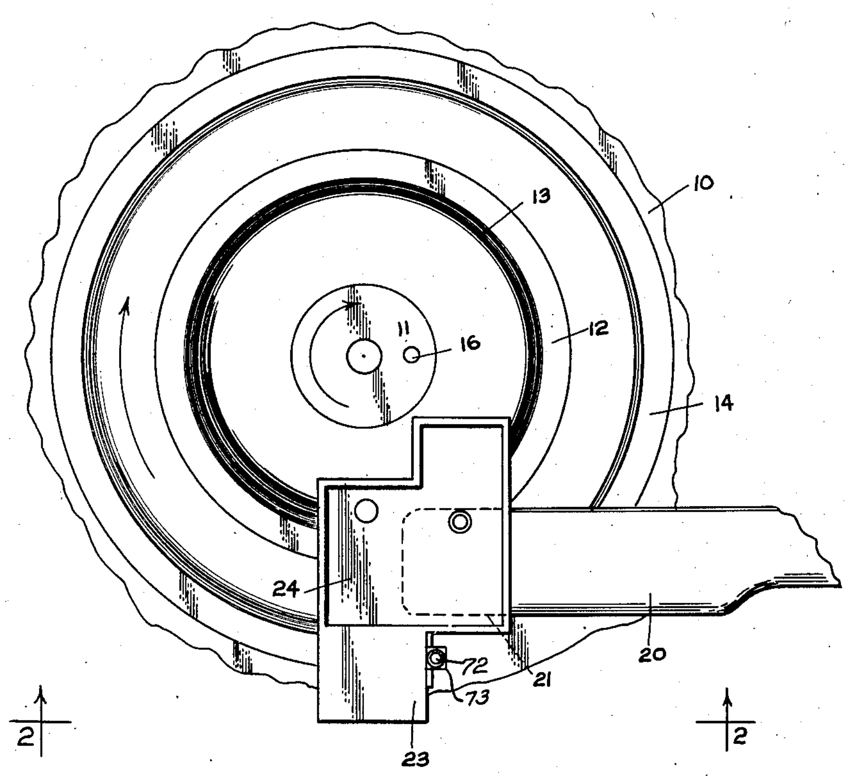
Figure 2:
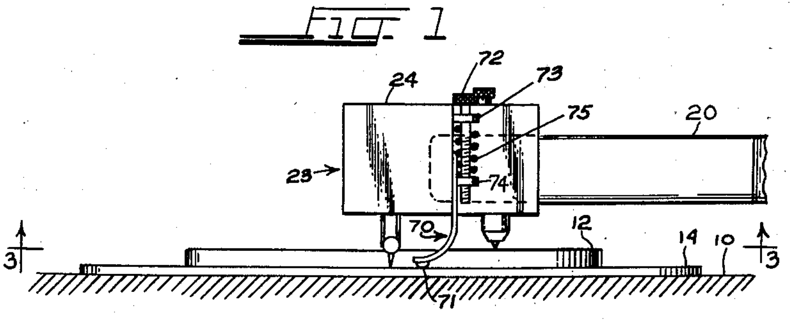
Figure 2 is a side elevation of the apparatus illustrated in Figure 1, taken along line 2—2 of Figure 1.

Referring first to Figures 1 and 2, phonograph turntable 10 has spindle 11. Turntable 10 accommodates an inner guide record 12 upon which a blank, helical track 13 has been embossed, the track groove having a desired pitch and having a desired track width and depth so that a tracking stylus may operate thereon. Such a guide tracking record is pre-fabricated of suitable metal or plastic. Beyond the edge of record 12 is record blank 14 upon which sound is to be recorded. Record blank 14 is of any suitable material available in the market.

Record blank 14 may extend up to spindle 11, part of the record being under guide record 12. Locking pin 16 may be provided on the pregrooved guide disc to engage a hold in blank 14 for insuring proper rotation of the discs. The positions of the guide and record discs may be reversed so that the guide grooves may be beyond the sound record grooves instead of as shown. To prevent record slippage on the turntable, tape or clamping may be used to tie the record to the turntable.

Phonograph turntable 10 may form part of a conventional phonograph having tone arm 20 and conventional pick-up. Since this invention is not concerned with the details of such a pick-up, no description thereof is given. Instead, tone arm 20 has end 21 within which the conventional pick-up may be disposed. Usually such a pick-up comprises a crystal or other unit which is housed within the shelter of the tone arm.

The recording head forming the subject matter of the present invention comprises a complete unit which is readily attachable and detachable from end portion 21 of tone arm 20. The entire recording head is disposed in housing 23 of suitable material such as plastic and comprises top portion 24 and downwardly extending side walls to be identified later. One of the side walls 25 has plate 26 with over-hanging lip 27 (Figure 4) extending inwardly of the wall.

Opposed to side wall 25 is boss 28 extending downwardly from top wall 24. Boss 28 carries lock screw 29 suitably threaded into a recess in the boss. Lock screw 29 functions as a clamp to control the position of sheet metal slide 30 having elongated slot 31 therethrough and downwardly extending lip 32. Slide 30 may be adjusted to dispose lip 32 at a predetermined distance from lip 27 after which the same may be locked by lock screw 29.

Side wall *26a* is cut away at *26b* to provide an opening wide enough to permit the end of a tone arm to extend into the housing.

The arrangement is such that the new recording head may be disposed over end portion 21 of the tone arm and locked in position by adjusting locking plate 30. Thus the recording head is properly locked into position upon the tone arm. The housing straddles end portion 21 of the tone arm, extending laterally therefrom on both sides.

In order to tighten the recording head upon the end of the tone arm, adjusting screw 34 threaded into boss 35 of wall 24 is provided. Adjusting screw 34 may bear down upon the top of the tone arm and press the bottom edges of the tone arm against lips 27 and 32. As is evident in Figure 2, the new recording head extends well below the level of the reproducing means within portion 21 of the tone arm. Thus the reproducer stylus is kept clear of the record blank.

The recording head is provided with tracking means as follows. Extending downwardly from top wall 24 of the recording head housing is sleeve 37. Sleeve 37 extends for a suitable distance from wall 24 and may extend to a point somewhat beyond the edge of side wall 38 of the housing. It is understood that the various side wall edges of the housing are substantially coplanar. Slidingly disposed in sleeve 37 is plastic plunger 39 carrying tracking stylus 40. Plunger 39 is biased downwardly on the record by spring wire 41. This wire is inserted through slot 43 in the side of the sleeve to engage the inside end of the plunger. Spring 41 is anchored at 44 to wall 24 and exerts sufficient pressure upon plunger 39 so that stylus 40 is forced outwardly from sleeve 37. Instead of the arrangement shown, a simple compression spring may be disposed inside of sleeve 37 between wall 24 and the inside of plunger 39. Tracking stylus 40 is adapted to ride in track 13 of pregrooved guide disc 12.

It will be noted that tracking stylus 40 is located at one side of the recording head housing, this being laterally of the tone arm so that the tracking stylus extends over guide disc 12. Located upon the opposite side of the recording head housing from the tracking stylus is a transducer for recording. The transducer is of the electro-magnetic type and is carried by mounting plate 45 which may have any suitable shape and is here illustrated as having a generally Z shape. Mounting plate 45 has attaching portion 46 for securing the same to the inside surfaces of wall 24 of the housing. Mounting plate 45 also has supporting portion 47 from which extend support leaves 49 and 50. Mounting plate 45, or at least portion 47 thereof, is of non-magnetic material and the entire supporting plate may be of aluminum or brass as examples. Leaves 49 and 50 of the support plate may have any shape and are shown as triangular. They have notches or slots 52 and 53 at the tips thereof, these slots extending straight toward portion 47.

Disposed in slots 52 and 53 are the ends of a generally T-shaped lamination 55 having leg portion 56 and shoulders 57 and 58. The lamination is preferably of soft steel and is soft enough so that it does not acquire any substantial permanent magnetization but has sufficient spring to return after lateral deflection of leg 56, within limits, assuming the deflecting force has been removed. Shoulders 57 and 58 of the lamination are disposed in slots 52 and 53 of the supporting plate and the metal or material of leaves 49 and 50 are twisted or forced together to lock the lamination into the slots.

Plate portion 47 of the mounting plate has aperture 61 through which lamination leg 56 may project. Aperture 61 is preferably large enough to provide for tolerances is centering the leg as well as permitting leg 56 to vibrate laterally. Disposed around leg 56 and between plate portion 47 and shoulders 57 and 58 is winding 63 having leads 64. Winding 63 may be rigidly attached to leg 56 so that the winding moves with the legs or the winding may be loose with clearance for leg movement.

Figures 3, 4, 5, 6, 7, 8, 9:
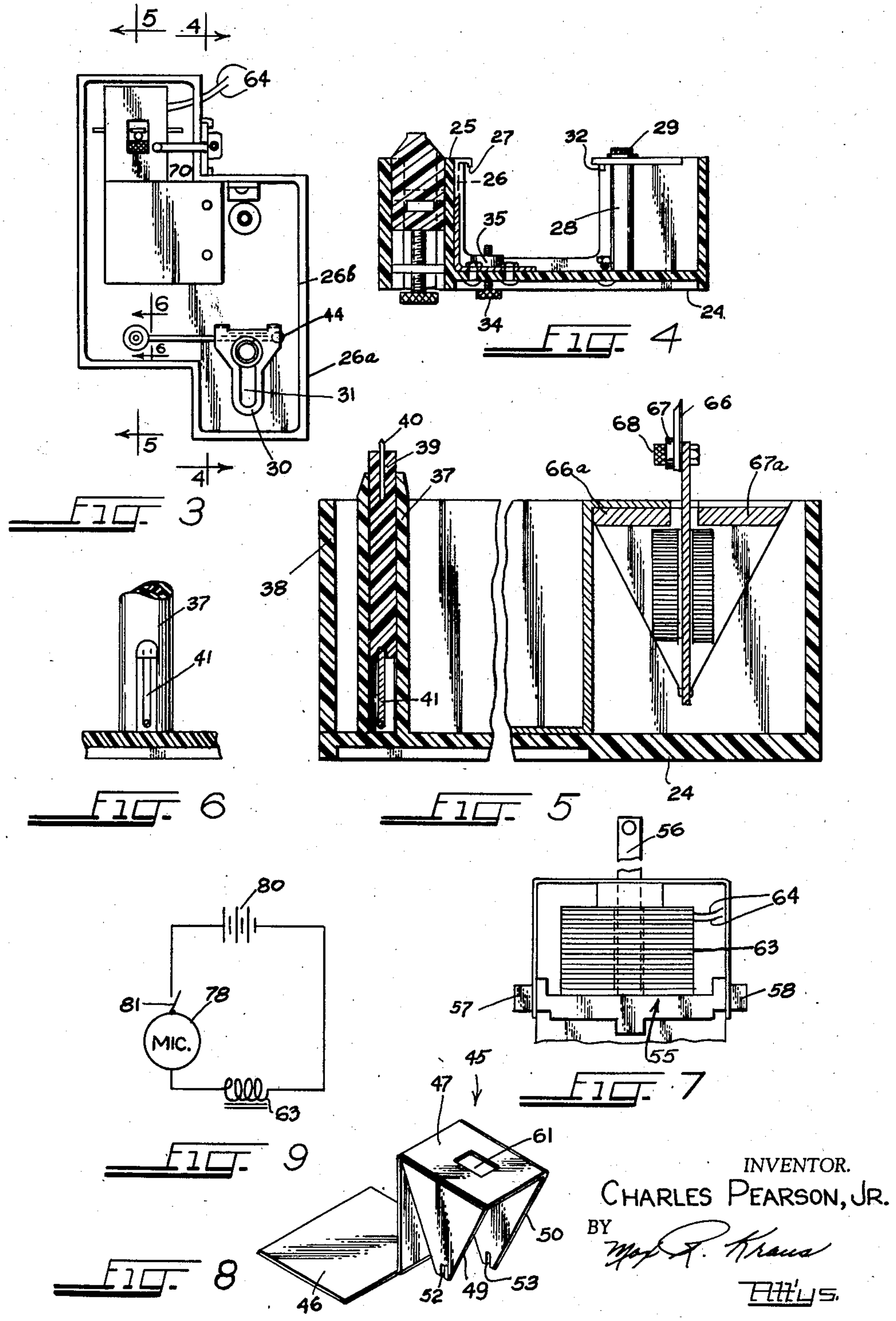
Figure 3 is a bottom view along line 3—3 of Figure 2 illustrating the new recording head.
Figure 4 is a sectional detail along line 4—4 of Figure 3.
Figure 5 is a sectional detail along line 5—5 of Figure 3.
Figure 6 is an enlarged detail.
Figures 7 and 8 are enlarged detail of the transducer portion of the recording head.
Figure 9 is a simple circuit diagram illustrating the manner in which the new recording head may be used.

Disposed against the inside (with respect to the housing) of portion 47 of the mounting plate are permanent magnets 66 and 67. These may be small bars of suitable material such as alnico V or any other suitable material. Permanent magnets 66 and 67 are disposed so that the opposed ends have opposite polarity and are equally spaced from lamination leg 56 by a short distance on each side of the leg as illustrated in Figure 5. As is indicated, permanent magnets 66 and 67 extend transversely of central leg 56 and for proper operation it is important that in the normal rest position, leg 56 of the lamination should be spaced equi-distant from the ends of magnets 66 and 67. This, of course, is on the assumption that the magnets are substantially equal in strength.

In order to provide such equal spacing, thin non-magnetic spacers such as cardboard, wood or the like may be disposed on opposite sides of leg 56, these spacers extending through aperture 61. Permanent magnets 66 and 67 are moved against these spacers and the magnets may thereafter be soldered in position, cemented or permanently attached to plate 47. The spacers may then be removed. If desired, resilient pads may be disposed between the opposed ends of the magnets and faces of leg 56. Such pads may damp vibrations of leg 56 to remove resonance peaks and provide a force to center the lamination.

It is not necessary that leg 56 of the lamination be symmetrically disposed in aperture 61 of the plate portion 47. As long as the clearance between the sides of leg 56 and the boundaries of the aperture are great enough to accommodate the spacers, that is all that is necessary. The spacers used to position the magnets symmetrically on opposite sides of the lamination leg will always be thicker than any amplitude of leg vibration.

If desired, winding 63 may be cemented to the magnets and leg 56 have sufficient clearance within the winding so that the leg may vibrate. The plane of the lamination and leg 56 is generally perpendicular to the radius from the center of the turntable so that lateral deflections of leg 56 will result in the free end of the leg vibrating generally perpendicular to the record track.

Leg 56 at the free end thereof has cutting stylus 66 of suitable shape. Stylus 66a is rigidly retained in chuck 67a carried by the free end of the lamination. Thumb screw 68 may be used to tighten the grip of the chuck upon the stylus. Instead of a stylus which may be replaced, a permanent stylus may be soldered or otherwise permanently attached to the free ends of leg 56. It is understood that the tip of the stylus is suitably shaped and oriented so that proper cutting action will result.

It is desirable to control the depth of cut of recording stylus 66a. To this end depth gauge 70 is provided having ball point 71 which is adapted to rest upon the surfaces of record 14 during cutting at a point adjacent the cutting region. Gauge 70 is adjustably secured to thumb screw 72 carried by part 73 of the housing. Thumb screw 72 carries nut 74 attached to gauge 70. Coil spring 75 is disposed around the body of thumb screw 74 and serves to bias gauge 70 down against the record during cutting. By adjusting thumb screw 72, the elevation of the recording head with reference to the record may be controlled and thus the depth of cut will also be controlled.

In order to use the recording head, a carbon or resistance type microphone 78 is connected in series with battery 80 and winding 63 of the cutting head. It is understood that microphone 78 permits a flow of current through winding 63 at all times but modulates the intensity of the current in accordance with sound waves impinging upon the microphone. Switch 81 is provided for opening the battery circuit when the cutting head is not being used.

With winding 63 of the cutting head energized by a current, there will be a tendency for leg 56 of the lamination to be forced either to the right or to the left as seen in Figure 5 depending upon the polarity of the current. The amount of deflection will depend upon the amplitude of the current waves through the windings.

It is possible to make the cutting head sufficiently sensitive and provide an electro-dynamic type of microphone so that a battery will not be necessary. This however would render the construction expensive and might necessitate one or more stages of amplification.

Having described the invention, what is claimed is:

1. In combination, a housing having a top wall and downwardly extending side walls, one of said side walls having a gap therein to accommodate the end of a tone arm of a phonograph, said housing having the interior thereof opposite the wall gap free so that said housing can be disposed over the end of a tone arm and extend laterally from the tone arm on both sides thereof, adjustable means on said housing for clamping said housing over the end of a tone arm, a stationary sleeve disposed within said housing and carried thereby adjacent one end of the housing and laterally of the tone arm, a plunger movable in said sleeve, said plunger being movable in a direction generally perpendicular to the plane of a record, a tracking stylus carried by said plunger at the free end thereof, means for biasing said plunger to an outward position with respect to said sleeve, said tracking stylus being adapted to cooperate with a pregrooved guide disc record having a track of desired pitch cut therein, said guide and blank discs having different sizes so that the usable portion of the record blank and the pregrooving are both accessible, and an electro-magnetic record cutting type of transducer carried within said housing, said transducer and tracking stylus being disposed laterally on opposite sides of the tone arm, said transducer having a cutting stylus for cutting a record groove in a record blank, said transducer being usable with a battery and resistance type of microphone to provide a simple and economical construction for use with a conventional phonograph.

2. The construction according to claim 1 wherein said transducer comprises a non-magnetic supporting plate having slotted parallel supporting portions, a T-shaped ferro-magnetic lamination having the shoulders of the T anchored in the slots, the leg of the T constituting the vibrating elements, the cutting stylus being mounted on the free end of said leg, a winding around the leg and permanent magnet means having active pole faces spaced from and disposed on opposite sides of said leg adjacent the free end thereof.

3. A cutting head for disc recording comprising a non-magnetic supporting plate having two depending leaves, each leaf having a slot at the end thereof, the plate having the central portion thereof apertured, a T-shaped lamination having the shoulders anchored in said slots and having the leg extending through the aperture, a stylus secured to the free end of said leg, a winding around said leg between the supporting leaves, and a pair of permanent magnets on opposite sides of the lamination leg on the inside surfaces of the plate, said magnets having active pole surfaces disposed in spaced relation to the lamination leg, said lamination leg being free to vibrate in response to currents passing through the winding.

4. The construction according to claim 3 wherein the plate portion aperture is substantially larger than the amplitude of any leg vibrations and means for centering said armature leg with respect to the magnet pole faces, said means comprising non-magnetic spacers on opposite sides of the armature and extending through the plate apertures, said magnets being movable into position against the spacers.

5. A recording head for recording on a disc record, said recording head comprising a housing having a top wall and downwardly extending side walls in the normal operating position of said recorder, said housing having a gap at one of the side walls for accommodating the end of a tone arm so that said housing can be disposed over the end of the tone arm to straddle to tone arm with the housing extending laterally on both sides of the tone arm, means for engaging the bottom edge of a tone arm, one of said means being adjustable to accommodate different widths of tone arms, clamping means for tightening the housing against the top of the tone arm to insure rigid retention, spring biased telescopic means carried by said housing and having a tracking stylus at the free end thereof, said telescopic means being disposed at one end of the housing, said tracking stylus cooperating with a pregrooved guide disc for guiding the record cutter to create a sound track, and an electromagnetic transducer supported in said housing at the other end thereof and radially offset with respect to the turntable from said tracking stylus.

6. The construction according to claim 5 wherein means are provided for adjusting the elevation of the recording head above the plane of the record to control the depth of cut.

7. The construction according to claim 6 wherein said telescopic tracking means comprises a cylindrical sleeve carried by said housing and a rod slidable in said sleeve, said rod carrying a tracking stylus at the free end thereof and spring means for biasing said rod to an outward position with respect to said sleeve.

References Cited in the file of this patent

UNITED STATES PATENTS

| | | |
|---|---|---|
| 2,314,345 | Cartella | Mar. 23, 1943 |
| 2,489,685 | Sultan | Nov. 29, 1949 |